(12) United States Patent
Berthou

(10) Patent No.: US 7,046,172 B2
(45) Date of Patent: May 16, 2006

(54) DUAL OPTICAL ANGULAR ENCODER

(75) Inventor: Nicolas Berthou, Aze (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/530,185

(22) PCT Filed: Oct. 21, 2003

(86) PCT No.: PCT/EP03/50741

§ 371 (c)(1),
(2), (4) Date: Apr. 4, 2005

(87) PCT Pub. No.: WO2004/003892

PCT Pub. Date: May 6, 2004

(65) Prior Publication Data

US 2006/0049964 A1  Mar. 9, 2006

(30) Foreign Application Priority Data

Oct. 25, 2002  (FR)  .................. 02 13406

(51) Int. Cl.
H03M 1/22  (2006.01)

(52) U.S. Cl. .......................... 341/13; 341/35
(58) Field of Classification Search ............... 341/13, 341/31, 35; 33/1 PT, 290, 292
See application file for complete search history.

(56) References Cited

U.S. PATENT DOCUMENTS

| 4,736,187 | A | * | 4/1988 | Kibrick et al. | ................. 341/3 |
| 4,827,123 | A | * | 5/1989 | Gray | ..................... 250/231.14 |
| 5,014,215 | A | | 5/1991 | Fuldner | |
| 5,386,220 | A | | 1/1995 | Kubota | |
| 5,699,058 | A | * | 12/1997 | Yanagisawa et al. | ......... 341/13 |
| 5,837,999 | A | * | 11/1998 | Horiuchi | ................ 250/231.14 |
| 6,097,319 | A | | 8/2000 | Liu | |
| 6,279,248 | B1 | | 8/2001 | Walters | |
| 6,542,088 | B1 | * | 4/2003 | Bielski et al. | ................ 341/15 |
| 6,683,543 | B1 | * | 1/2004 | Yeo | ............................. 341/13 |
| 6,946,649 | B1 | * | 9/2005 | Uenaka et al. | ......... 250/231.13 |
| 6,963,064 | B1 | * | 11/2005 | Updegrave | ............. 250/231.13 |

* cited by examiner

Primary Examiner—Linh V. Nguyen
(74) Attorney, Agent, or Firm—Lowe Hauptman & Berner, LLP

(57) ABSTRACT

To monitor the reliability of the information provided by a dual optical angular encoder, comprising two pairs of cells for detecting marks borne by a disc, at a given instant, the sequences of at least four successive states taken by the two groups of cells before this instant are compared and the incrementation or decrementation indications given by the two groups are validated if the sequence for a group is either identical or phase-offset by at most one state, ahead or behind, with respect to the sequence of the other group.

4 Claims, 3 Drawing Sheets

DUAL OPTICAL ANGULAR ENCODER

CROSS-REFERENCE TO RELATED APPLICATIONS

The present Application is based on International Application No. PCT/EP2003/050741, filed on Oct. 21, 2003, which in turn corresponds to FR 02/13406 filed on Oct. 25, 2002, and priority is hereby claimed under 35 USC §119 based on these applications. Each of these applications are hereby incorporated by reference in their entirety into the present application.

FIELD OF THE INVENTION

The invention relates to optical angular encoders providing binary logic signals representing the increments of rotation of the encoder. These optical encoders are used in the manner of potentiometers, for example for the manual control of electronic apparatuses sensitive to an input parameter that may vary continuously or almost continuously, but they are much more reliable than potentiometers. Typically, in an application in respect of aeronautical equipment, an optical angular encoder can be used to indicate to an automatic piloting computer an altitude or speed preset that the pilot chooses by actuating a control button which rotates the encoder. The reliability of the encoder and of the information that it delivers is then an essential element of the encoder.

BACKGROUND OF THE INVENTION

It is desired to produce accurate and reliable encoders that are made to operate in a secure manner so as to allow their basic function to be achieved even if certain elements of which they are composed develop a fault.

An optical angular encoder typically consists of a disc bearing regular marks, this disc being caused to rotate by actuation of a control button (for example a manual control button). A photoelectric cell fixed in front of the disc detects the filing past of the successive marks when the control button rotates the disc. The marks are typically openings in an opaque disc, a light-emitting diode being placed on one side of the disc and the photoelectric cell being placed on the other side.

Each passage of a mark constitutes an increment of a unit in the counting of the rotation of the disc. The angular resolution is determined by the angular pitch of the marks regularly disposed over a disc revolution. To detect both increments and decrements of angle of rotation when the direction of rotation is reversed, two photoelectric cells are provided, physically offset by an odd number of quarters of a pitch between them. Thus, the lit/unlit logic states of the two cells are encoded on two bits which successively take the following four successive values 00, 01, 11, 10 when the disc rotates in one direction and the following four successive values 00, 10, 11, 01 when the disc rotates in the other, so that it is easy to determine, not only the appearance of an increment of rotation (change of state of one of the bits) but the direction of the increment (by comparison between a state of the cells and the immediately prior state).

To increase the reliability of systems using such encoders, in particular for aeronautical applications, it has been proposed that the encoder be dualized or at least that the photoelectric cells inside the encoder be dualized. This makes it possible in part to detect faults such as the nonoperation of a light-emitting diode or of a detection diode since the states provided by the two cells are compared and the incrementation or decrementation information is validated only if it is provided in an identical manner by both encoders or both groups of photoelectric cells of the encoder. If the information is not identical it may be concluded that one cell at least (light-emitting diode or detection diode) is faulty and the count is invalidated by giving an error or fault indication signal.

However, this comparison of the signals of the two groups of cells turns out to be difficult since the positioning of the first group of cells must be rigorously identical to the positioning of the second group: while the offset by an odd number of quarters of a pitch of the marks between the two cells of one and the same group may be slightly inaccurate, the offset between the two groups of cells must be very accurately a multiple of the pitch spacing of the marks.

If matters are not so, it leads to a situation in which the incrementations or decrementations determined by the cells do not occur rigorously at the same moment. Admittedly the increments and decrements will be detected by the two groups of cells, but perhaps with a very slight offset in time. Consequently, it becomes possible for the computer, responsible for polling the counters associated with the two groups of cells in order to monitor the consistency of the indications given by these counters, to find at a given moment that the indications are not identical whereas, if it had polled a very short instant afterwards, it would have found identical indications.

To solve this problem, provision may be made for a delay in validating the comparison, that is to say the computer provides an error indication only if this error persists for a certain time. However the time for which it is necessary to wait is poorly determined since it depends on the speed of rotation of the button. For a manual control, the time that it is necessary to wait will be longer if the user turns the button more slowly. This leads to the fault indication being postponed for example by two seconds, this not always being acceptable. Moreover, this procedure consists in seeing faults since the computer detects them as potential faults but in regarding them as false faults for a certain time even if they are true faults. This solution is not satisfactory.

SUMMARY OF THE INVENTION

The invention proposes a different means for monitoring the reliability of the information provided by the dual optical angular encoder. This means consists essentially in comparing not the states of the cells of the two groups of cells at a given instant but the sequences of at least four successive states taken by the two groups of cells before this instant and in validating the indications given by the two groups if the sequence for a group is either identical or phase-offset by at most one state, ahead or behind, with respect to the sequence of the other group.

The encoder making it possible to implement this technique is a dual incremental optical angular encoder, comprising at least one disc bearing marks and two pairs of cells for detecting marks, each pair of cells providing a logic state consisting of a pair of logic levels allowing the determination of an increment of rotation +1 or −1 when the disc revolves, this encoder being characterized in that it comprises means for comparing (in principle periodically, by polling) a sequence of four successive states S0, S1, S2, S3 taken by the first pair of cells, with a sequence of four successive states S'0, S'1, S'2, S'3 taken by the second pair of cells, the last states S3 and S'3 of these sequences being the states taken at the instant at which the comparison is made, and means for providing an indication of erroneous counting if the sequence S'0, S'1, S'2, S'3 is not equal to S0, S1, S2, S3 or Sx, S0, S1, S2, or S1, S2, S3, Sy, in which Sx represents a prior state of the first pair (state immediately prior to the sequence S0, S1, S2, S3) and Sy is a possible state of the first pair such that the increment in passing from S3 to Sy is not greater than 1 in absolute value.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will become apparent on reading the detailed description which follows and which is given with reference to the appended drawings in which.

DETAILED DESCRIPTION OF THE INVENTION

Figure 1:
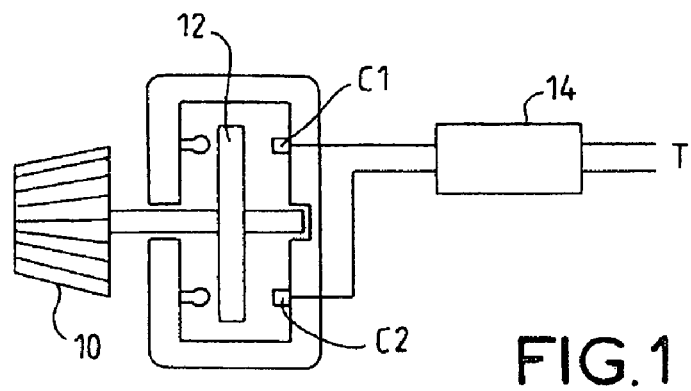
FIG. 1 diagrammatically represents the principle of a simple optical angular encoder of the prior art.

Represented diagrammatically in FIG. 1 is the principle of a simple optical angular encoder. The encoder comprises a control button 10 that can be turned manually and which drives a plane disc 12 bearing marks regularly spaced with an angular pitch P; these marks are preferably openings in the disc, the latter being opaque. The width of the openings is preferably equal to the spacing between the openings, hence, P/2, in the most interesting case where the encoder makes it possible to encode by incrementation and by decrementation.

A pair of optical detection cells C1, C2 is used to detect the passage of the marks during the rotation of the disc. These cells C1, C2 are spaced apart by an odd number of half-spacings between marks, that is to say by an odd multiple $(2k+1)P/4$ of a quarter of the angular pitch P, k being any integer. When the marks are openings in the disc, provision is preferably made for a light-emitting diode to be placed opposite each cell, on the other side of the disc with respect to the cell, so that the passage of an opening in front of the cell strongly illuminates the cell. After amplification and clipping, the cell provides rectangular signals visible in FIG. 2. The cell C1 of the pair of cells provides periodic notches during the regular rotation of the disc. These notches have a period T if the disc rotates at constant speed. The cell C2 of the pair provides identical notches but out of phase by n/2 or 3 n/2 on account of its physical offset $(2k+1)P/4$ with respect to the cell C1.

Figure 2:
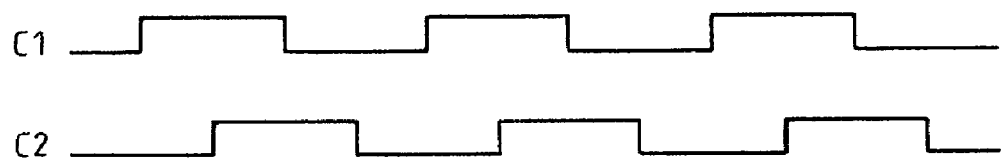
FIG. 2 represents the possible successive logic states of the cells of a pair when the disc rotates.

There are four possible logic states for a pair of cells, which are successively, if the disc rotates in the direction which corresponds to the notches of FIG. 2, State A: cell C1 at 0, cell C2 at 0: 00
State B: cell C1 at 1, cell C2 at 0: 10
State C: cell C1 at 1, cell C2 at 1: 11
State D: cell C1 at 0, cell C2 at 1: 01

There is no other possible state. After state D we revert to state A. These states are not of interest in themselves; what is of interest is the transition from one state to another: the transitions from 00 to 10, from 10 to 11, from 11 to 01 and from 01 to 00 all correspond to an increment of +1, the transition from 00 to 01, from 01 to 11, from 11 to 10 and from 10 to 00 all correspond to an increment of −1, that is to say to a unit rotation in the reverse direction.

A simple encoder 14 analyses these transitions so as to provide a logic signal T having, in the presence of an actual rotation, two possible logic values, the one corresponding to an increment of +1 and the other to an increment of −1. The signal T can comprise two bits, the one indicating that there is rotation and the other indicating the direction of rotation, incrementation or decrementation. This signal T is applied to a counter which counts up or counts down in the presence of a rotation.

The control button is provided with indexation slots to avoid the possibility of it stopping in a position where a detection cell is neither entirely in front of a mark nor entirely between two marks.

If one wishes to improve the reliability with a dual encoder, in principle comprising a single disc but two independent detection cell pairs instead of one, the encoder then provides a signal T and a signal T' representing the successive increments or decrements detected on the basis of each of the pairs of cells. The second pair of cells C'1, C'2 is physically offset with respect to the first (C1, C2) by an integer number of pitches of the marks of the disc and consequently it provides at the same moment exactly the same state transitions.

Figure 3:
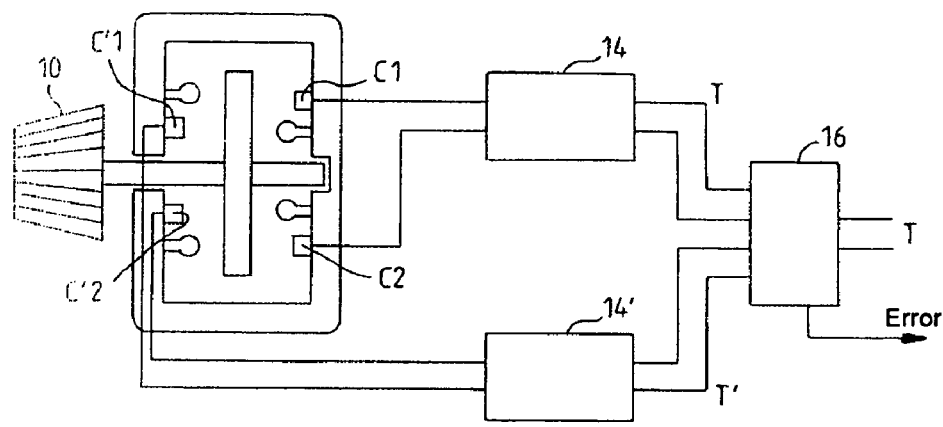
FIG. 3 represents the principle of a dual encoder with monitoring of one channel by the other.

FIG. 3 represents the encoder architecture resulting therefrom: the signals emanating from the pairs of cells are processed separately and culminate with the separate calculation of the increments T and T'. These increments are compared in a verification circuit 16 before being sent to the counter which determines the angular position of the control button. If the increments are not identical, then one of the pairs of cells is operating abnormally and an error signal is emitted.

However, even when the cells are operating normally, the second pair of cells may not be exactly in phase with the first on account of a slight mechanical offset, the changes of logic state of the cells of the two pairs are not exactly synchronous. As a result, if the verification of the identity of the increments is done during the instant at which the pairs of cells do not provide identical indications, the consolidation circuit is at risk of detecting an error although only a very slight mechanical positioning defect is involved.

Figure 4:
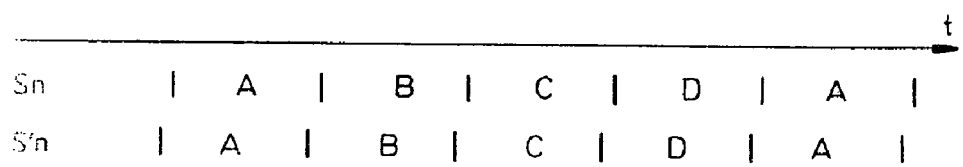
FIG. 4 represents a chart of the alterations in the states of the two pairs of cells of the encoder of FIG. 3, in the case of a regular rotation.

FIG. 4 represents the temporal alterations of the state signals which are derived from the examination of the signals provided by the pairs of cells C1, C2 and C'1, C'2 during a rotation. The signal Sn represents the state A or B or C or D of the pair of cells C1, C2 in the course of a rotation assumed to be at uniform speed. The vertical bars represent the precise instants of changes of state. The signal S'n represents the same thing for the pair of cells C'1, C'2 in the course of the same rotation. If there is a physical offset that is not rigorously equal to an integer multiple of the pitch of the marks, between the two pairs of cells, the instants of change of state do not occur rigorously at the same instants for both pairs of cells even though they regain identical states a very short instant afterwards. In the case represented, time flowing toward the right, the pair of cells C'1, C'2 is slightly phase-offset ahead with respect to the other. If the rotation were performed in the opposite direction, the pair of cells C'1, C'2 would be behind with respect to the pair C1, C2.

If the verification circuit 16 polls the identity of the transitions between T and T' at an instant situated during this short phase-offset and not while the states Sn are quite steady and identical, there is a risk of an error being detected.

Rather than establishing a time constant during which the flagged differences of transition are eliminated, it is proposed according to the invention that the last four states of the two pairs of cells be observed and that a validation of the incrementation or the decrementation be carried out as a function of a comparison of these states.

Consequently the succession of states taken by the first pair of cells is observed. Let S0, S1, S2 and S3 be the last four states, S3 being the last, corresponding to the state for which one wishes to perform a validation by comparison with the other pair of cells.

If the cells of the second pair are perfectly in phase mechanically with those of the first pair, the succession of the last four states S'0, S'1, S'2, S'3 taken by the second pair at the same instant (S'3 being the state at the same instant T) is rigorously identical to the succession S0, S1, S2, S3 regardless of the instant of comparison. This is the ideal situation.

If a slight phase offset occurs, in a configuration such as that of FIG. 4, the situation will be the same for any instant of comparison save in the exceptional case where this instant is situated during the short phase offset where the states of the pairs of cells are momentarily different.

Figure 5:
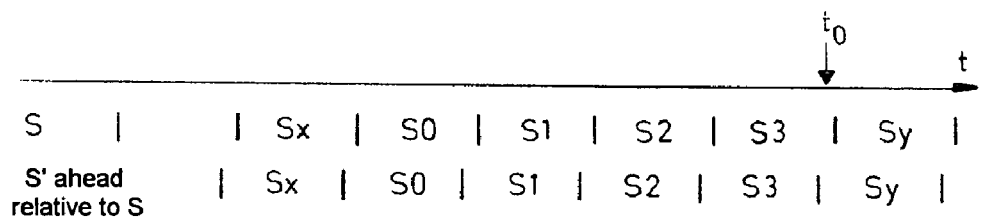
FIG. 5 and FIG. 6 represent time charts of the alteration of states of the pairs of cells.
Figure 6:
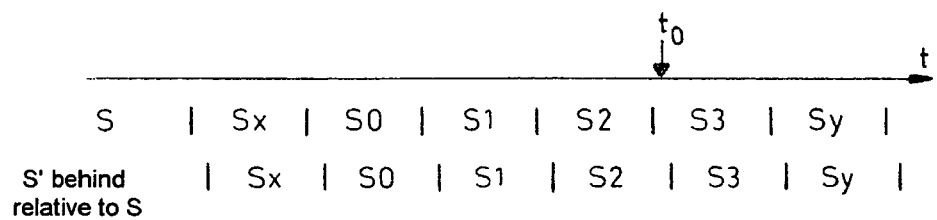

FIGS. 5 and 6 represent a succession of states Sx, S0, S1, S2, S3, Sy, taken by the two pairs of cells, in two different configurations of phase offset between cells and at different observation instants t0 in the two configurations but both taken while the pair of cells C1, C2 is in the state S3.

FIG. 5 represents the case where the pair of cells C'1, C'2 providing the state S' is very slightly ahead in phase and the observation instant t0 is situated exceptionally at the very end of the state S3, at a moment where S' has already toggled from its value S3 to a new value Sy whereas S has not yet done so on account of the slight phase offset. The value Sy depends of course on the fact that the rotation occurs or stops or reverses. Sy can have only one of the following three values: Sy=S3 (rotation interrupted); or Sy different from S3 by an increment +1; or Sy different from S3 by an increment −1.

In this case, the sequence of the last four states of S' before the instant t0 is S1, S3, S3, Sy whereas the sequence of the last four states of S at the same instant is S0, S1, S2, S3.

FIG. 6 represents the reverse case where the pair of cells C'1, C'2 is slightly behind with respect to the pair C1, C2, and the observation instant t0 lies exceptionally at the very start of the state S3, whereas S' has not yet toggled into this state S3 on account of the slight phase offset.

The sequence of the last four states taken by the pair of cells C'1, C'2 before the observation instant t0 is then Sx, S0, S1, S2 whereas the succession of states S is S0, S1, S2, S3.

Consequently, if the two pairs of cells operate normally, the succession of states taken by the second pair for a succession S0, S1, S2, S3 taken by the first pair will be:

in general S0, S1, S2, S3, whether or not there is a slight phase offset between the pairs;

exceptionally S1, S2, S3, Sy but in this case Sy may differ from S3 only by a positive or negative increment at most;

or exceptionally Sx, S0, S1, S2 where Sx is the state preceding S0 and may likewise differ from S0 only by 0 or +1 or −1.

Hence, according to the invention provision is made for the verification circuit 16 to comprise means for comparing at an instant t0 the sequence of four successive states S0, S1, S2, S3 taken by the first pair of cells before this instant, with the one sequence of four successive states S'0, S'1, S'2, S'3 taken by the second pair of cells before the same instant. This circuit provides an indication of erroneous counting if the sequence S'0, S'1, S'2, S'3 is not equal to S0, S1, S2, S3 or Sx, S0, S1, S2, or S1, S2, S3, Sy, in which Sx cannot differ from S0 by more than one unit, and Sy cannot differ from S3 by more than one unit.

Figure 7:
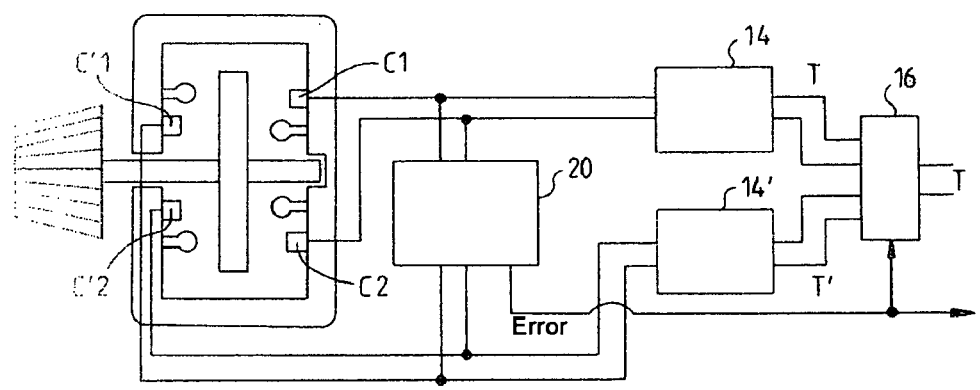
FIG. 7 represents the architecture of an optical angular encoder according to the invention.

FIG. 7 represents the encoder according to the invention. A verification circuit 20, which may be added or substituted for the verification circuit 16, receives the states of the pairs of cells directly. It systematically stores at least the last four states of each pair of cells and validates a transition T bound for the counter only if the sequences of four states comply with what has been stated hereinabove; otherwise it sends an error signal.

To verify whether the sequence of states taken by the second pair is Sx, S0, S1, S2 it is possible to use as value of Sx either the true value which has actually been taken by the pair of cells, but then it has to be stored in addition to the four states taken by the pair of cells: in this case five successive states are stored. Or, the fifth state is not stored but the transition is validated only if Sx does not differ from S0 by more than one unit.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A dual incremental optical angular encoder, comprising:

a disc bearing marks and two pairs of cells for detecting marks, each pair of cells providing a logic state having of a pair of logic levels allowing a determination of an increment of rotation +1 or −1 when the disc revolves, means for comparing at a given instant a sequence of four successive states S0, S1, S2, S3 taken by the first pair of cells, with a sequence of four successive states S'O, S'1, S'2, S'3 taken by the second pair of cells, the last states of these sequences being the states taken at the instant at which the comparison is made, and means for providing an indication of erroneous counting if the sequence S'O, S'1, S'2, S'3 is not equal to S0, S1, S2, S3 or Sx, S0, S1, S2, or S1, S2, S3, Sy, in which Sx represents a prior state of the first pair and Sy is a possible state of the first pair such that the increment in passing from S3 to Sy is not greater than 1 in absolute value.

2. The angular encoder as claimed in claim 1, wherein the means for comparing comprise means for verifying whether the sequence taken by the second pair of cells is equal to Sx, S0, S1, S2, in which Sx is the state of the first cell immediately prior to S0, and these means comprise for this purpose means for storing a sequence of states of the first pair of cells comprising the five states prior to the moment at which the comparison is made.

3. The angular encoder as claimed in claim 1, wherein the means for comparing comprise means for verifying whether the sequence taken by the second pair of cells is equal to Sx, S0, S1, S2 where Sx is any state which differs from the state S0 by at most one unit.

4. A method for ensuring the security of operation of a dual optical angular encoder comprising two pairs of cells for detecting marks on a disc, these pairs of cells providing logic states whose succession determines increments of rotation of the encoder, this method being characterized in that at a given instant the sequences of four successive states taken by the two pairs of cells before this instant are compared and the transition indications given by the two pairs are validated if the sequence of four states for a pair is either identical to the sequence of the other pair, or phase-offset by at most one state, ahead or behind, with respect to the sequence of the other pair.

* * * * *